United States Patent [19]

Fisher et al.

[11] Patent Number: 5,661,356
[45] Date of Patent: Aug. 26, 1997

[54] MOTOR SHAFT DISCHARGE DEVICE

[76] Inventors: Rodney R. Fisher, 3175 NW. Crocker La., Albany, Oreg. 97321; Hugh E. Boyanton, 146 Kevin Way, Salem, Oreg. 97306

[21] Appl. No.: 622,917

[22] Filed: Mar. 27, 1996

Related U.S. Application Data

[63] Continuation of Ser. No. 141,350, Oct. 22, 1993, abandoned.

[51] Int. Cl.$^6$ .......................... H01K 39/00; H02K 13/00
[52] U.S. Cl. .................... 310/219; 310/89; 310/220; 439/29
[58] Field of Search ............... 310/219, 89, 220; 439/29

[56] References Cited

U.S. PATENT DOCUMENTS

| | | | |
|---|---|---|---|
| 2,959,697 | 11/1960 | Clarke | 310/232 |
| 3,226,666 | 12/1965 | Lord | 339/5 |
| 3,286,069 | 11/1966 | Bugg | 200/166 |
| 3,742,264 | 6/1973 | Anderson et al. | 310/42 |
| 3,790,832 | 2/1974 | Patel | 310/113 |
| 3,882,366 | 5/1975 | Clunis | 318/326 |
| 4,019,076 | 4/1977 | Bates | 310/233 |
| 4,139,251 | 2/1979 | Miller et al. | 339/5 M |
| 4,403,164 | 9/1983 | Preece | 310/232 |
| 4,429,242 | 1/1984 | Layh | 310/71 |
| 4,550,283 | 10/1985 | Leach et al. | 322/48 |
| 4,566,744 | 1/1986 | Engelenburg et al. | 339/8 L |
| 4,663,550 | 5/1987 | Kawada et al. | 310/93 |
| 4,684,179 | 8/1987 | Freeman | 439/27 |
| 4,831,295 | 5/1989 | Posedel | 310/72 |
| 4,841,187 | 6/1989 | Hayke et al. | 310/171 |
| 4,853,575 | 8/1989 | Lessig, III | 310/171 |
| 4,873,512 | 10/1989 | Miller | 340/679 |
| 4,939,506 | 7/1990 | Gram | 340/649 |
| 4,954,084 | 9/1990 | Pugh et al. | 439/29 |
| 4,992,691 | 2/1991 | Mlynarz | 310/232 |
| 5,227,950 | 7/1993 | Twerdochlib | 361/221 |
| 5,233,499 | 8/1993 | Twerdochlib | 361/212 |
| 5,258,675 | 11/1993 | Nelessen | 310/91 |

OTHER PUBLICATIONS

Lawson, J. Allan; "Motor Bearing Fluting"; 1993 IEEE (conference record of) Annual Pulp and Paper Industry Technical Conference; Hyannis, Massachusetts; Jun. 21–25, 1993; pp. 32–35.

Kerszenbaum, Isidor; "Shaft Currents in Electric Machines Fed by Solid State Drives"; 1992 IEEE (conference record of the) Industrial and Commercial Power Systems Technical Conference; Pittsburgh, Pennsylvania; May 4–7, 1992; pp. 71–79.

Jones, Roger W.; Seaver, Delbert E.; "Investigation and Results of Eddy Currents on DC Motor Bearings"; 1990 EEE (conference record of the) Annual Pulp and Paper Industry Technical Conference; Seattle, Washignton; Jun. 18–22, 1990; pp. 145–150.

Prashad, Har; "Theoretical and Experimental Investigations on the Pitch and Width of Corrugations on the Surfaces of Ball Bearings"; Wear (an international journal on the science and technology of friction, lubrication and wear); vol. 143, No. 1, pp. 1–14; Mar. 10, 1991.

*Primary Examiner*—Steven L. Stephan
*Assistant Examiner*—Elvin G. Enad
*Attorney, Agent, or Firm*—Dellett and Walters

[57] ABSTRACT

A grounding system for an AC or DC motor or other rotating apparatus employs a conductive brush in resilient contact with a contamination free conductive member removably secured onto a rotating part such as a motor shaft or tachometer shaft. The contacting surface is preferably formed of brass and is shielded from contamination from motor bearings and the like, for reliably shunting the shaft to the frame of the machine so as to avoid high voltage transients across bearings as would otherwise result in bearing damage or destruction.

42 Claims, 14 Drawing Sheets

MOTOR SHAFT DISCHARGE DEVICE

This application is a continuation of application Ser. No. 08/141,350 filed on Oct. 22, 1993 now abandoned.

BACKGROUND OF THE INVENTION

This invention relates to an apparatus for electrically discharging a shaft and more particularly a rotating shaft of an AC or DC motor employing a solid-state, variable-speed drive.

It is known that bearing assemblies suffer premature wear, i.e., "fluting", when journalling shafts carrying excessive voltage levels. A shaft of an electric motor, or even a non-driven roller, can inductively or capacitively couple electrical energy such that voltage or current levels may exceed a given threshold, thereby causing an electrical discharge through a bearing/race discharge site. The discharge pits the bearing and race at the vicinity of the discharge and the pitting damage results in fluting of the bearing race assembly. Electric motors are especially vulnerable to such bearing degradation when employing solid-state, variable-speed drives.

Isidor Kerszenbaum, "Shaft Currents and Electrical Machines Fed by Solid-State Drives", 1992 *IEEE industrial and Commercial Power Systems Technical Conference*, 1992 Conference Record, pages 71–79, provides two primary theories according to which solid-state switching vices of a variable-speed drive induce current in a motor shaft. According to the firs current inducement method, "dissymmetry effects", the reluctance path of a motor changes as a function of the angular position of the motor's rotor due to magnetic asymmetries of either a stator or a rotor core. For instance a stator core of the motor may have two air gaps of differing gap widths on opposing sides of the stator for preventing magnetic saturation therein. As a rotor of the machine rotates within the surrounding stator, the magnetic poles of the rotor create asymmetric reluctance paths about the stator core in accordance with the angular position of the rotor's magnetic poles and the gap width ratio between the two air gaps of the stator.

According to the alternative "homopolar flux effects" mechanism outlined by Kerszenbaum, the induced currents are attributed to a form of axial magnetization. However, the homopolar flux effects mechanism is considered primarily relevant to only large and fast rotating machines, i.e., turbo generators, and is of little consequence for most machines driven by solid-state, variable-speed drive.

J. Allan Lawson, "Motion Bearing Fluting", 1993 *Annual Pulp and Paper industries Technical Conference*, 1993 Conference Record, pages 3214 35 discusses dynamic changes inside an electric motor as causing induced shaft currents, with non-uniform air-gap magnetic flux transitions within the motor being the primary cause. An air-gap flux of an electric motor originates from "field" (stator) poles of the motor. Ideally each field pole is identical to the other field poles for providing balanced excitation of the motor. However, in reality, the windings of the various poles differ from one another resulting in non-uniform excitation of the motor such that non-uniform magnetic flux transients cross the shaft for inducing currents within the shaft. The magnitude of the induced currents is determined in accordance with the extent of the magnetic non-uniformity and the rate of change associated with the flux transitions.

Solid state variable speed drives are used with electrical motors for controlling the speed of the motor. For DC motors, pulse width or phase duty cycle modulation is employed for adjusting the average DC current level. For AC synchronous motors, the solid state switches provide pulse trains for synthesizing a desired frequency signal. However, the switching transients associated with these techniques produce abrupt current transients causing rapid magnetic flux transitions within the motor. Thus, a motor employing a solid state variable speed drive, and having a given level of magnetic imbalance, will suffer induced current levels of a greater magnitude than the same motor without the variable speed drive.

The relationship can be explained in accordance with Lenz's law wherein, $$E = \frac{-DC}{DT} \; ; \; V = -\frac{d\phi}{dt}$$

Voltage is generated by the changing magnetic field wherein the voltage magnitude is related to the rate of flux variation. Thus, for the induced currents in a motor shaft, the solid-state devices of a variable-speed controller, which rapidly switch currents through the field or armature windings generate magnetic fields which change quickly with respect to time. If the flux lines cross the shaft in a non-uniform manner, the flux transitions induce voltages, and likewise currents, within the shaft at levels related to the rate of change of the flux transition and the motor's magnetic imbalance.

As with the shaft of an electrical motor, it is also possible for a non-driven shaft to electrostatically accumulate charge, acquiring a voltage level. For instance, paper generating static electricity while being rolled about the shaft of a roller can cause charge to accumulate on the shaft until a given voltage level is built up whereupon an electrical discharge occurs through a bearing/race assembly journalling the shaft, causing pitting.

Regardless of the manner in which the shaft acquires a voltage or current, electrical discharge through the bearing assembly is undesirable in that such electrical discharge leads to bearing failure. The electrical discharge pits the bearing and race at the discharge interface. Eventually the pitting leads to "fluting" (a characteristic wear within the assembly) and failure. To prevent premature failure, the motor may be constructed magnetically symmetric, or an alternative shaft discharge path provided around the bearing assembly. One known discharge apparatus for a rotating shaft which is typically steel, comprises a grounding brush contacting the outside diameter of the rotating shaft. However, the electrical interface of a steel motor shaft and carbon brush is less than ideal for providing a reliable electrical contact therebetween. The steel shaft of the motor builds up an insulating oxide layer for degrading the electrical interface, while grease and oil from the motor or roller bearing assembly accumulate on the shaft and contaminate the electrical interface. Therefore, in order to assure the reliability for such a grounding brush technique, it would be necessary that the brush/shaft assembly be cleaned or maintained frequently to prevent oxidation, film and contamination build-up for assuring reliable electrical contact therebetween.

Another prior art technique employs a copper ring within a motor which is received onto the shaft in a heated condition and then allowed to cool for providing a snug fit about the shaft, providing a copper contacting surface for a grounding brush. However, the copper can corrode and likewise accumulate grease and external matter thereon for the same reasons that the shaft does. Furthermore, to fit a heated copper ring over the shaft, it is required that the motor be disassembled for inserting the copper ring. Such a disassembly can be even more burdensome than continually cleaning the shaft.

Therefore, it is an object of the present invention to provide an improved apparatus for discharging a rotating shaft.

It is another object of the present invention to provide the discharge apparatus with a reliable low-impedance discharge path.

It is another object of the present invention to provide an apparatus for discharging a rotating shaft which apparatus may be easily assembled to an existing motor.

Finally, it is desirable the discharging apparatus be resistant to environmental factors.

SUMMARY OF THE INVENTION

In accordance with the present invention, a motor shaft, or other rotating member, is provided with a contact member having a contacting surface preferably formed of brass and adapted to avoid sources of contamination. The contact means is removably coupled for rotation with the shaft and electrically connected thereto. Holder means positions a brush resiliently against the contacting surface for shorting electrical voltage transients to the equipment frame.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
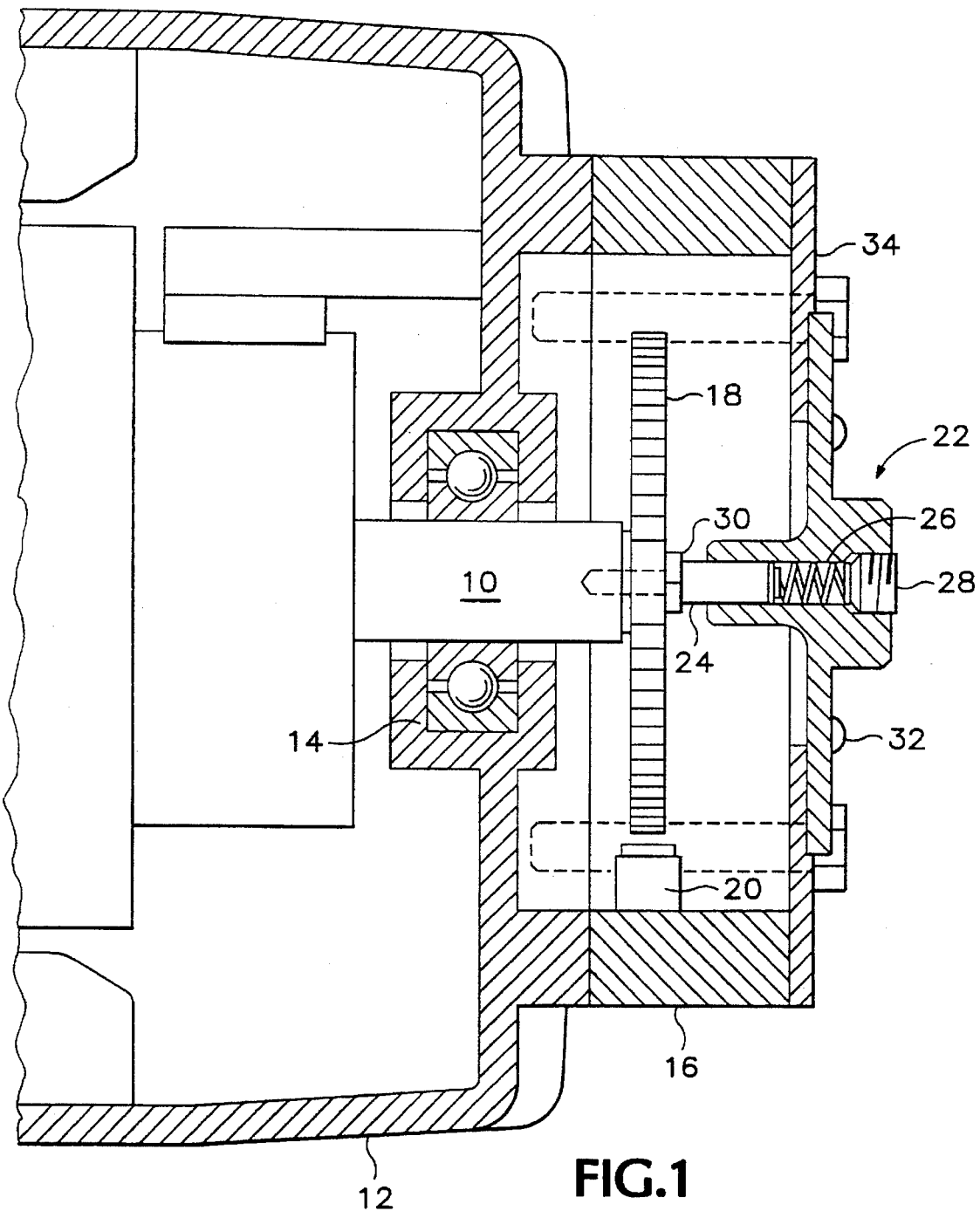
FIG. 1 is a longitudinal cross sectional view of a motor incorporating a grounding system according to the present invention.
Figure 1A:
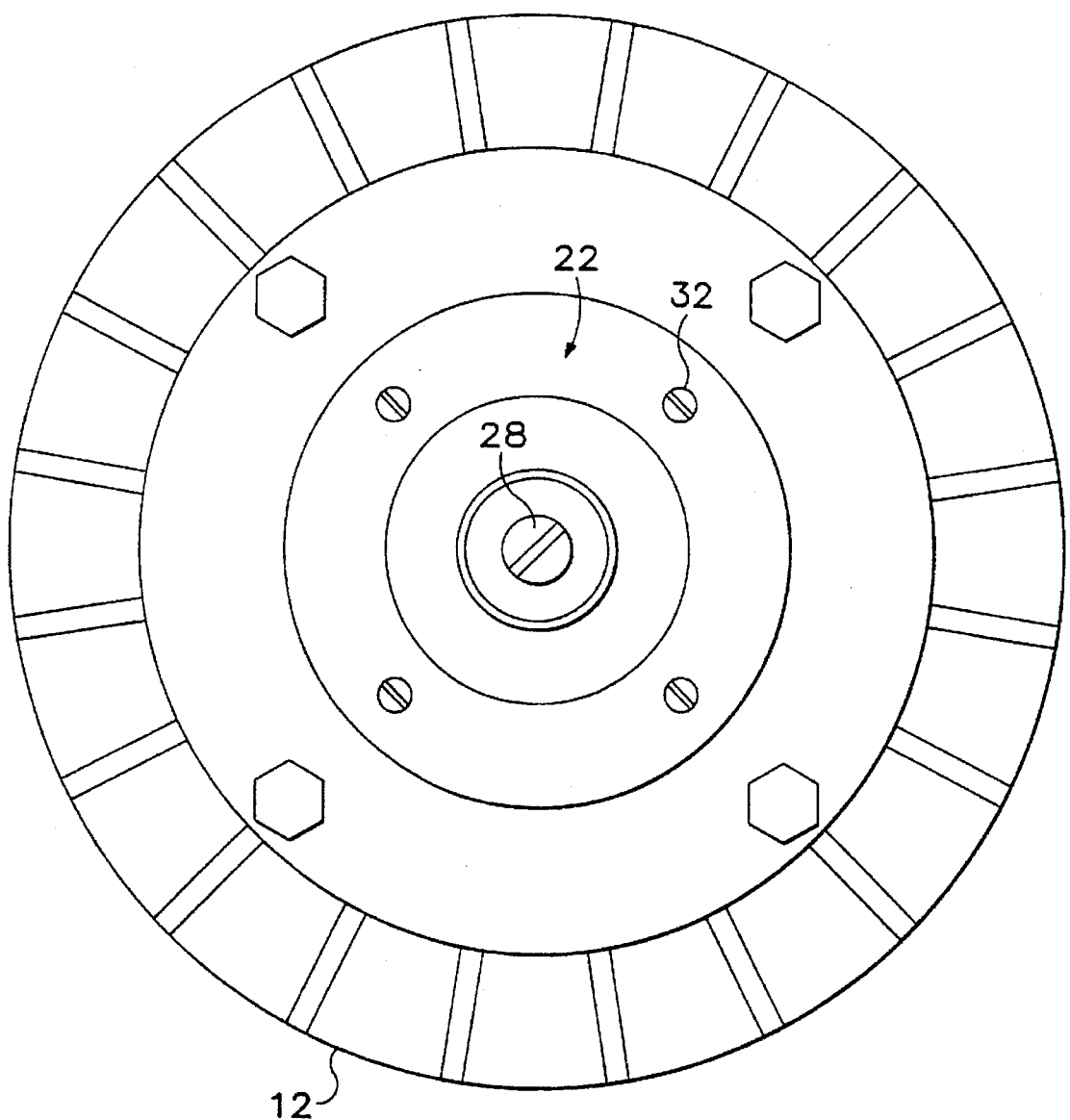
FIG. 1A is an end view of the FIG. 1 system.

Referring to the drawings and particularly to FIGS. 1 and 1A, the shaft 10 of DC motor 12 is rotatably supported in bearings 1, the shaft extending into a tachometer housing 16 provided with a tachometer wheel 18 coupled to the end of the motor shaft. The tachometer 16 is attached at the commutator end of the DC motor and is further provided with a tachometer sensor 20 which supplies a signal in accordance with the number of teeth 18 passing the sensor, thereby indicating motor speed. In accordance with an embodiment of the present invention, the tachometer outer cover is removed and replaced by a grounding system cover comprising a holder 22 having a central bore for receiving brush 24 and spring 26 as well as a retainer screw 28 at the threadable end of the bore. Screw 28 adjustably bears on spring 26 for urging brush 24 in a direction substantially axial of motor shaft 10. The holder 22, which is centrally enlarged to extend axially toward the tachometer wheel while providing a bore long enough to receive the brush, spring and retaining screw, is further supplied with a radial flange that is secured to face plate 34 of the tachometer by means of screws 32.

The conventional holding screw for the tachometer wheel 18 is replaced with a threaded member 30 adapted to secure tachometer wheel 18 in place, while also being provided with a contacting surface substantially orthogonal to the axis of shaft 10 for brush 24 to ride upon. The member 30 is suitably formed of brass or stainless steel having a polished flat head of diameter to completely abut the end of brush 24.

Many large, industrial DC motors are provided with a tachometer as illustrated in FIG. 1 so that the motor speed can be accurately ascertained and controlled. The grounding system is ideally located at the tachometer end of the motor for grounding not only the tachometer but also the motor shaft. Moreover, the tachometer wheel protects the grounding system from motor bearing grease.

The grounding system according to FIG. 1 is quickly and economically installed on most motors and fully shorts the motor shaft to motor frame ground, substantially eliminating motor shaft voltages, bypassing the bearings. Therefore, the life of the motor bearings, such as bearing 14, is substantially increased.

Figure 2:
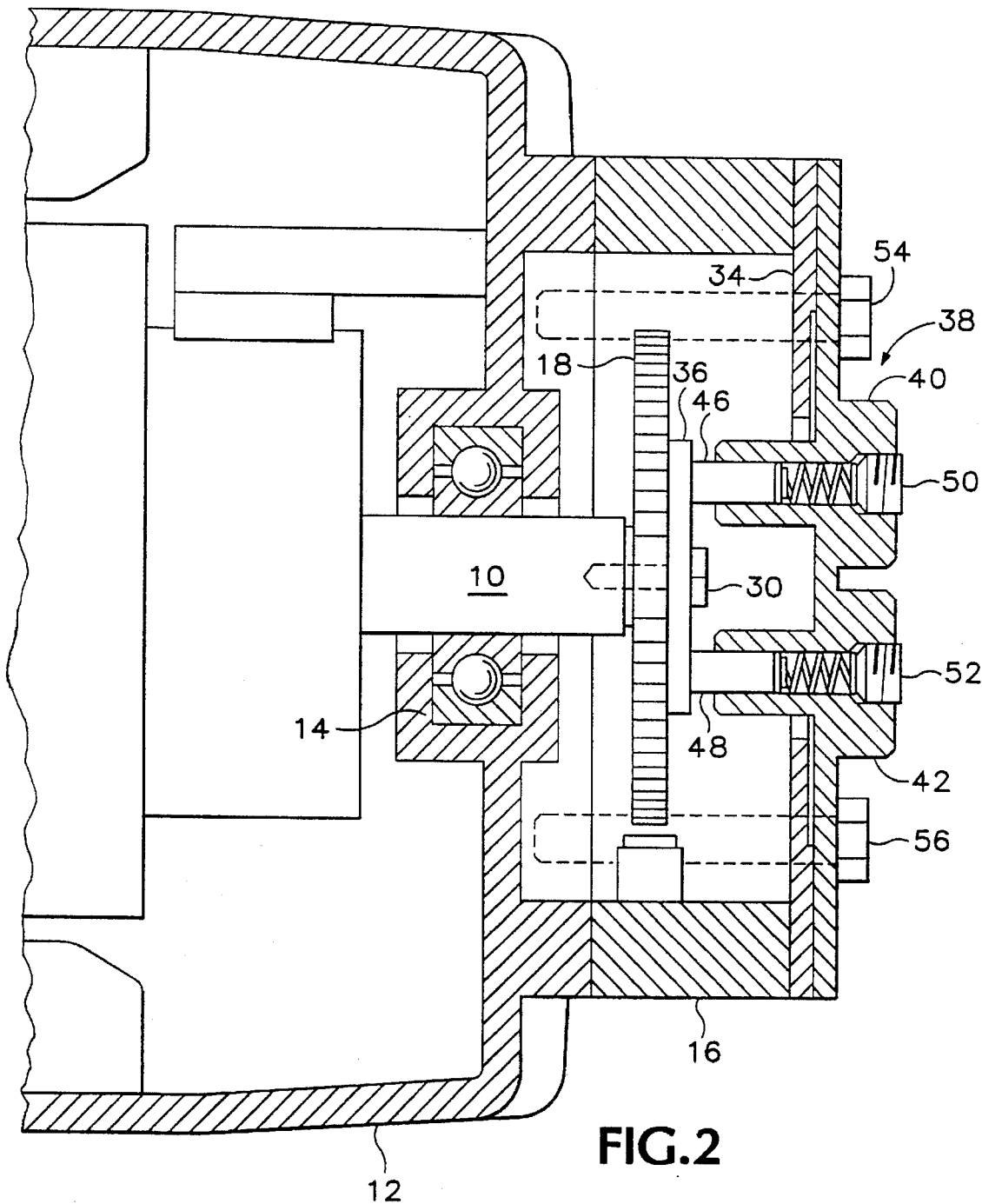
FIG. 2 is a longitudinal cross sectional view of a motor incorporating a grounding system according to a second embodiment.
Figure 2A:
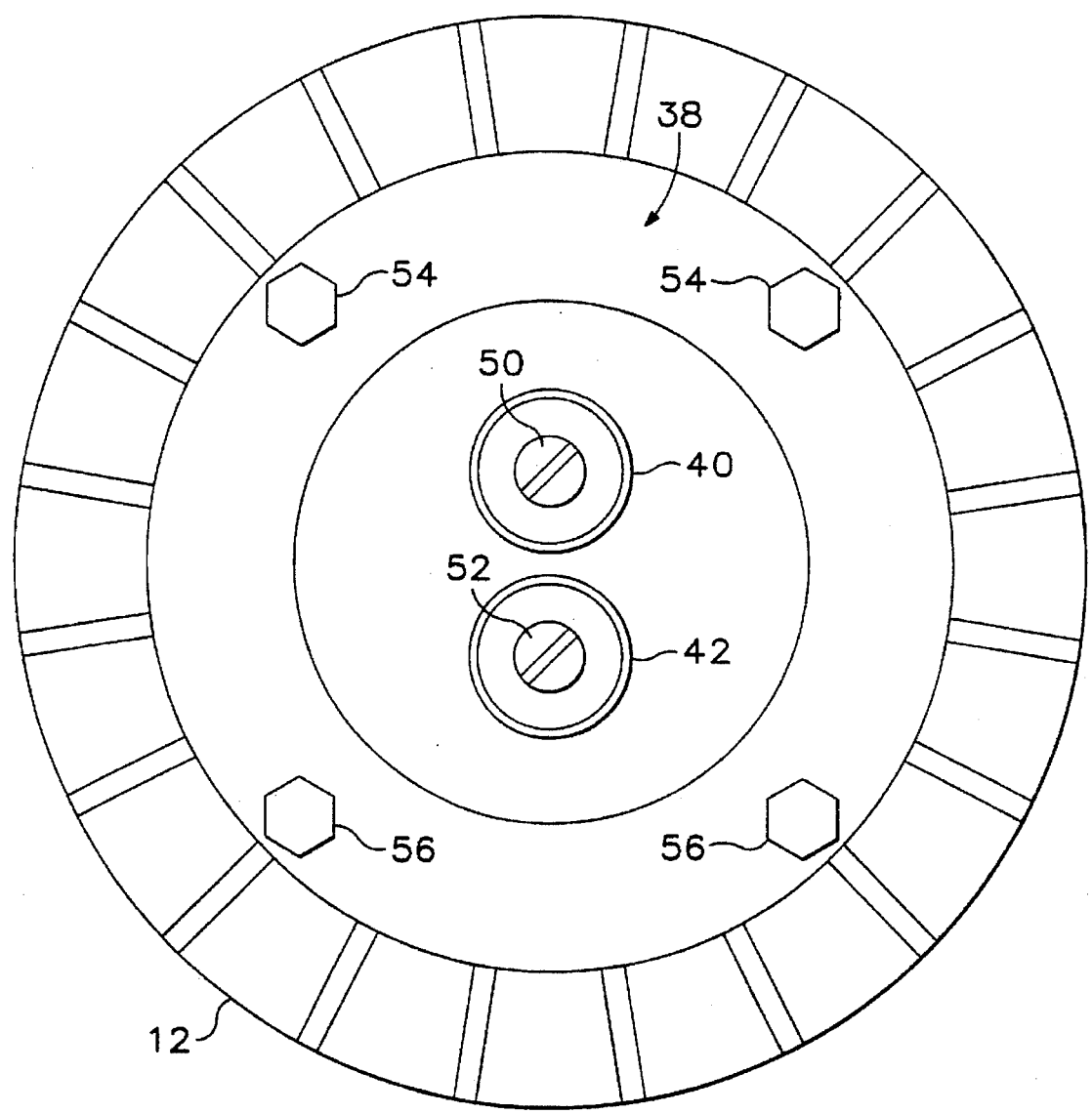
FIG. 2A is an end view of the FIG. 2 system.

Referring to FIGS. 2 and 2A, a second embodiment is illustrated wherein a contact means is secured to tachometer wheel 18 in the form of a brass disc 36 centrally bored to receive the shank of tachometer wheel bolt 30. In this embodiment, a pair of brushes 46 and 48 are urged in a direction axial of the motor shaft toward disc 36 wherein disc 36 is large enough in diameter to fully abut the brushes in sliding relation as the motor rotates. Holder 38 is centrally axially enlarged at the locations of brushes 46 and 48 to receive brushes in bores thereof as well as the attendant springs and retaining screws. The brushes are equally spaced on opposite sides of the motor shaft axis and are separately adjustable via the retainer screws 50 and 52 as threadably received in forward bosses 40 and 42 of the holder. The holder 38 is provided with a radial flange of approximately equal diameter as the face plate 34 of the tachometer which is held in place by means of the tachometer bolts 54 and 56.

The embodiment of FIGS. 2 and 2A is somewhat preferred in comparison with the embodiment of FIG. 1 and FIG. 1A because rotation of brass disc 36 provides a wiping contact with the brushes 46 and 48. Also a redundant electrical path to ground is secured. Therefore, slightly better results are achieved relative to eliminating the motor shaft voltage, which, of course, is shorted to the motor frame ground. The contacts are again shielded from the motor bearings.

Figure 3:
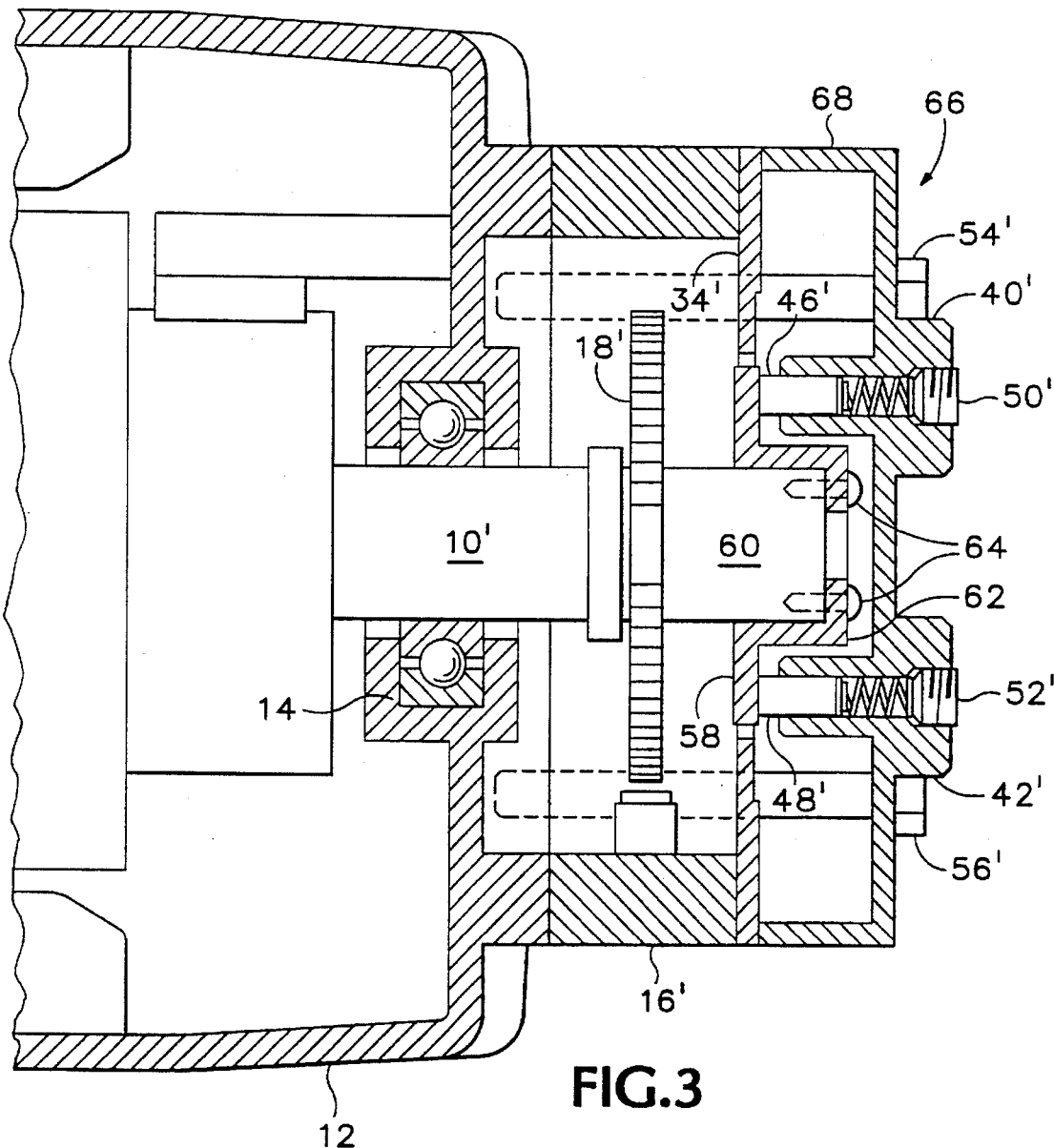
FIG. 3 is a longitudinal cross sectional view of a motor incorporating a grounding system according to a third embodiment.
Figure 3A:
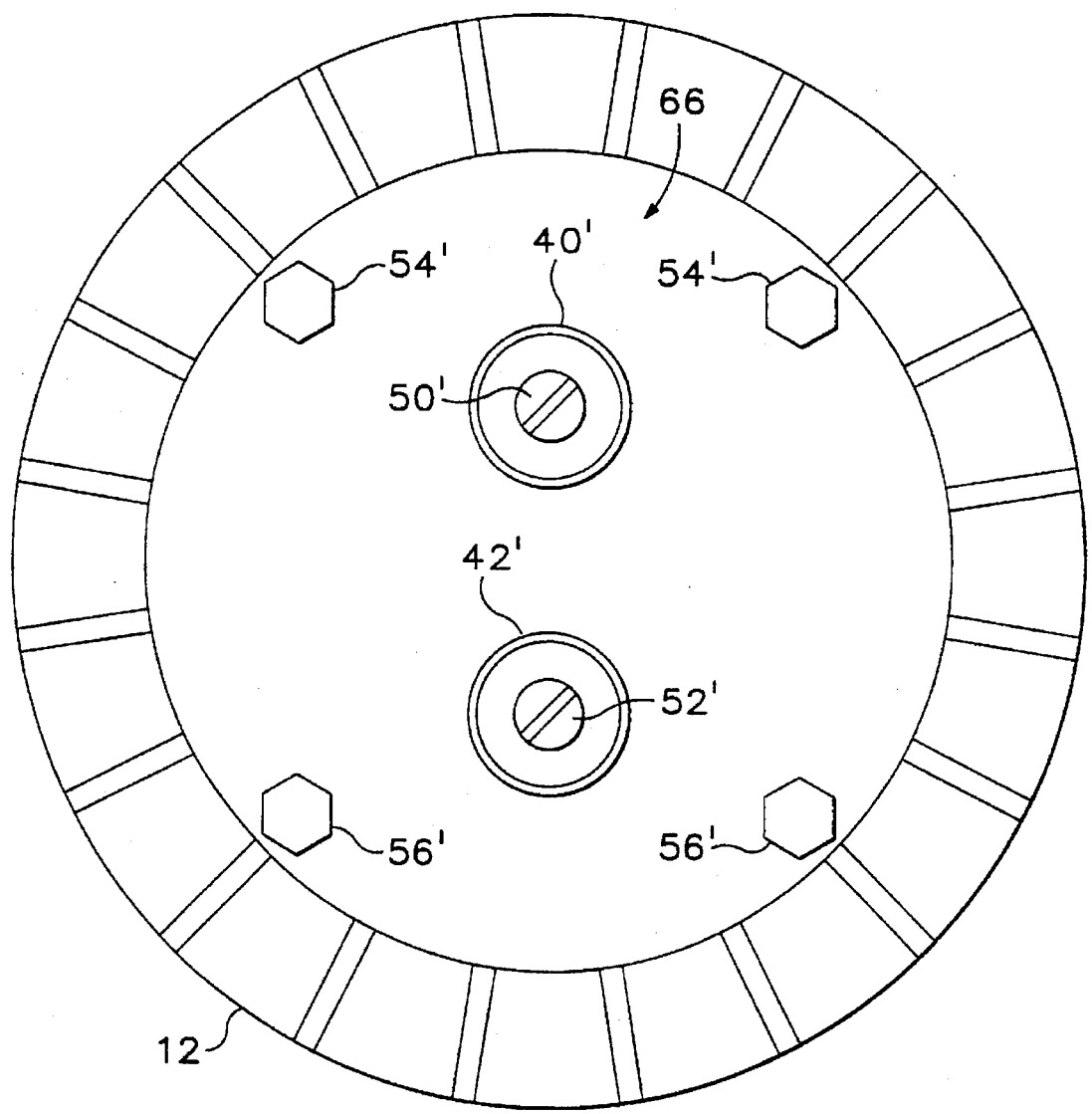
FIG. 3A is an end view of the FIG. 3 system.

The embodiment of FIG. 3 is similar to the embodiment of FIGS. 2 and 2A with the exception that in place of brass disc 36, a brass wheel 58 is affixed to the stub shaft 60 extending from a somewhat larger DC motor. The brass wheel 58 has a radial flange of sufficient diameter so that brushes 46' and 48' fully ride thereupon for shorting out the motor shaft to the frame. Central hub 62 of brass wheel 58 receives therewithin the outer end of stub shaft 60 and is secured thereto by two screws 64. The brush holder 66 of this embodiment is somewhat larger, providing wider spacing of the brushes for placement thereof on opposite sides of hub 62, holder 66 also including an axial flange 68 for spacing the brushes at a slightly greater distance from the end of motor 12. Bolts 54' and 56' secure both holder 66 and tachometer 16' to the frame of motor 12. The embodiment of FIG. 3 likewise prevents damage to bearings 14 by shorting high voltage transients from the motor shaft to frame ground.

It will be noted that in the case of the embodiments of FIGS. 1, 2 and 3, the location where a brush contacts a brass member on which it rides is advantageously protected from grease from bearing 14 by the interposition of the tachometer wheel 18 or 18'.

Figure 4:
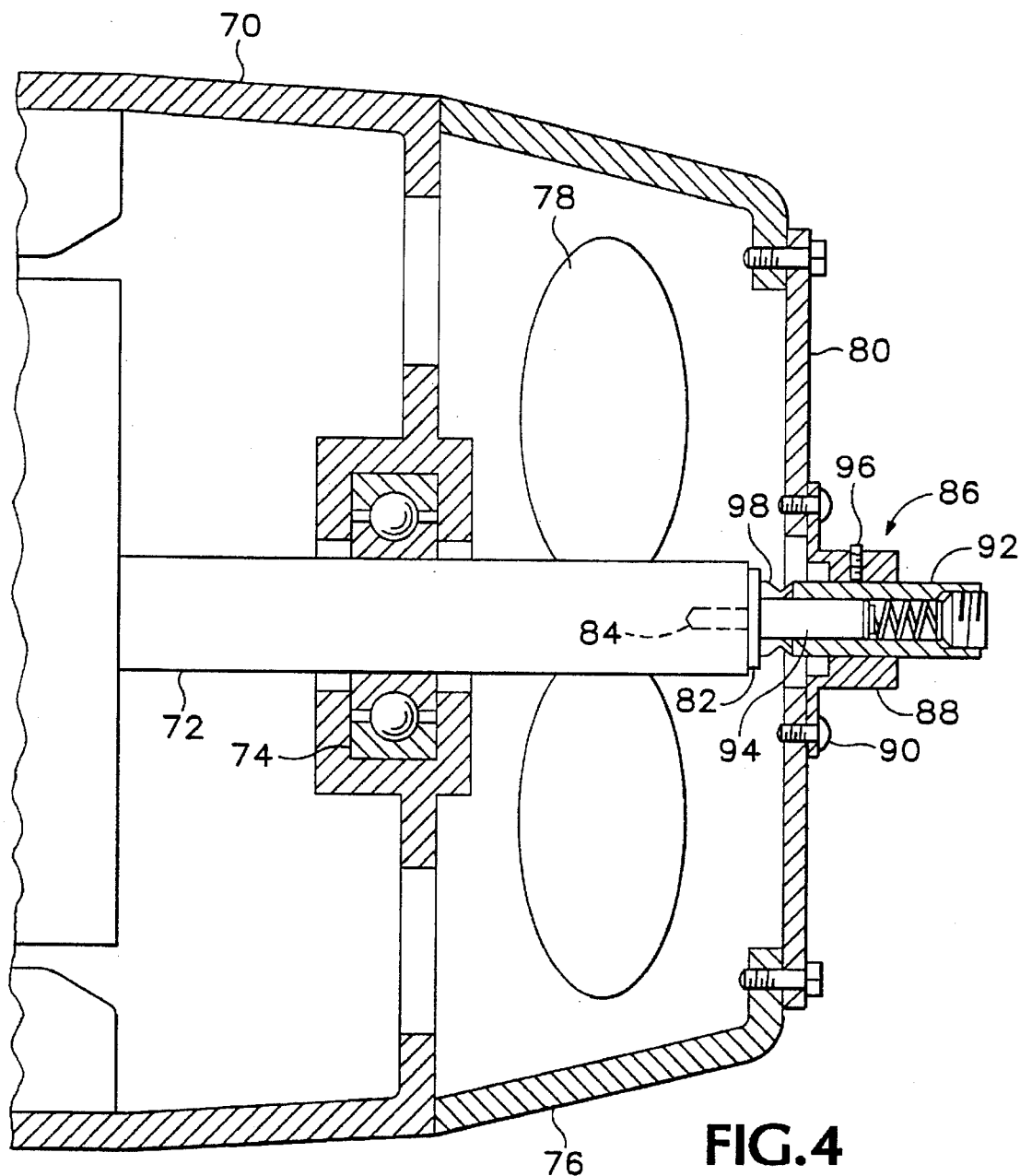
FIG 4 is a longitudinal cross sectional view of a motor incorporating a grounding system according to a fourth embodiment.
Figure 4A:
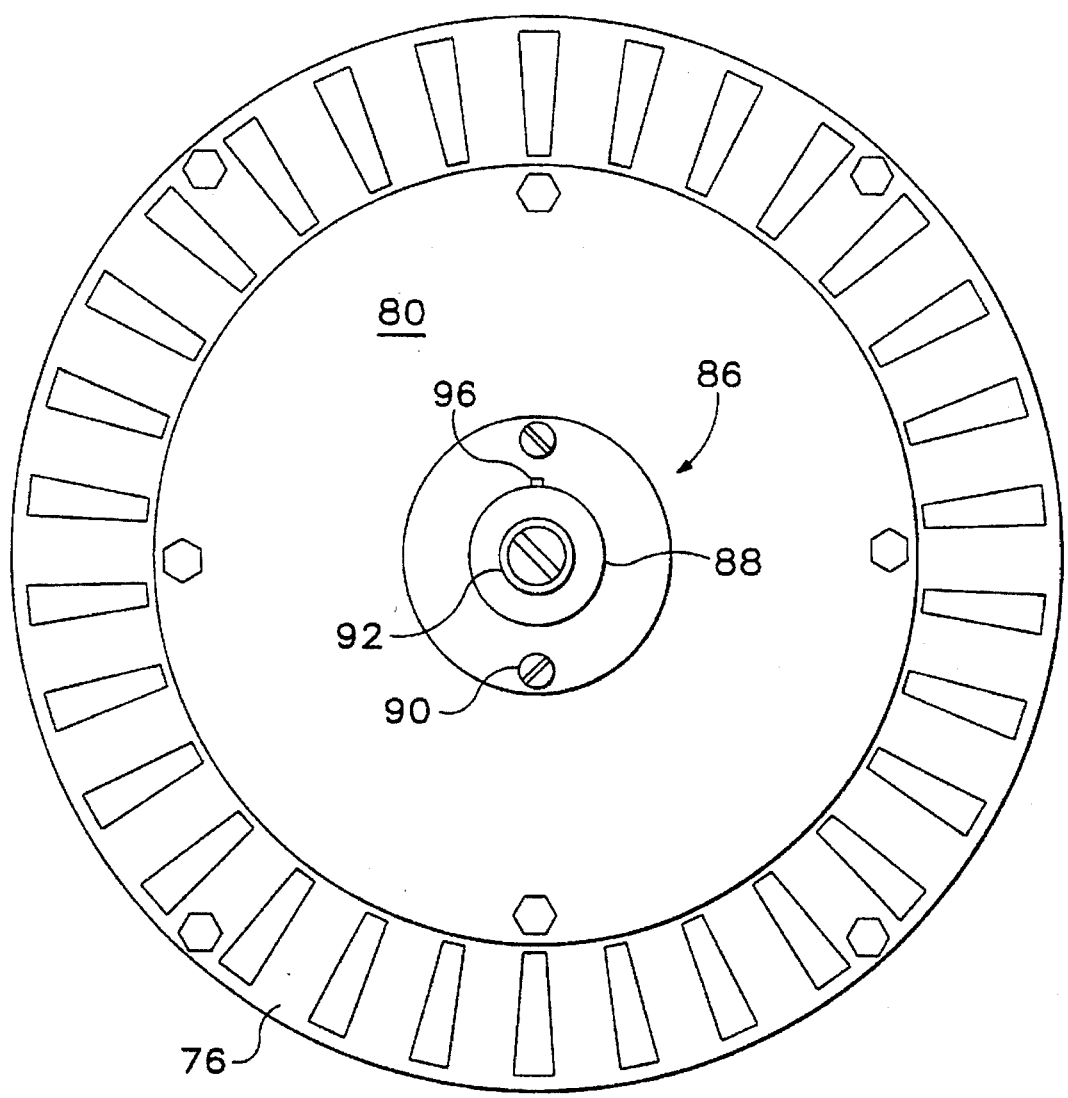
FIG. 4A is an end view of the FIG. 4 system.

Referring now to FIGS. 4 and 4A, an AC motor 70 is illustrated, the motor having a shaft 72 extending past bearings 74 to the region within fan housing 76 where the shaft is provided with fan 78. The shaft voltage discharging apparatus in accordance with this embodiment is secured to fan housing cover 80 via a central aperture formed therein, the central aperture being aligned with the end of the shaft 72. Contact means 82 comprises a brass plate having a contacting surface which is substantially orthogonal to the axis of the motor shaft and which is secured to an axial tapped hole in the motor shaft by threaded extension 84. A brush holder 86 comprises an outer cylindrical member 88 having a radial flange and secured to fan housing cover 80 by means of screws 90. Outer member 88 has an axial bore for receiving a sliding member 92, the latter having an axial bore for supporting brush 94 which rides upon the flat, polished end of contact 82. The sliding member 92 is axially movable for accurately locating the brush 94 in its correct central position, and is then locked employing set screw 96 threadably received in member 88. It is found that motors vary to a considerable degree as to the distance between the fan housing cover 80 and the end of shaft 72. Therefore sliding member 92 can be positioned as appropriate. Of course, the bore within member 92 also contains a spring and a retaining screw.

Compressible ring 98 receives brush 94 therethrough and is located between contact 82 and the inner ed of sliding member 92. This compressible ring is suitably an elastomeric V-ring, e.g. formed of rubber and having a split or V-shaped rim at its widest part so that it may be compressed. The V-ring is compressed when the shorting brush is installed by first urging the retaining screw as far as possible toward contact 82 and then withdrawing the same slightly so that the V-ring continues to be firmly engaged between contact 82 and member 92. The set screw 96 is tightened to maintain the V-ring position. The V-ring aids in protecting the contact area between brush 94 and contact 82 from grease and moisture, and as the carbon from the brush wears on contact 82, the V-ring 98 is lubricated. The brush 94 which is positioned substantially axially of shaft 92 by the holder 86, is efficient in shorting shaft 72 to motor frame ground.

Figure 5:
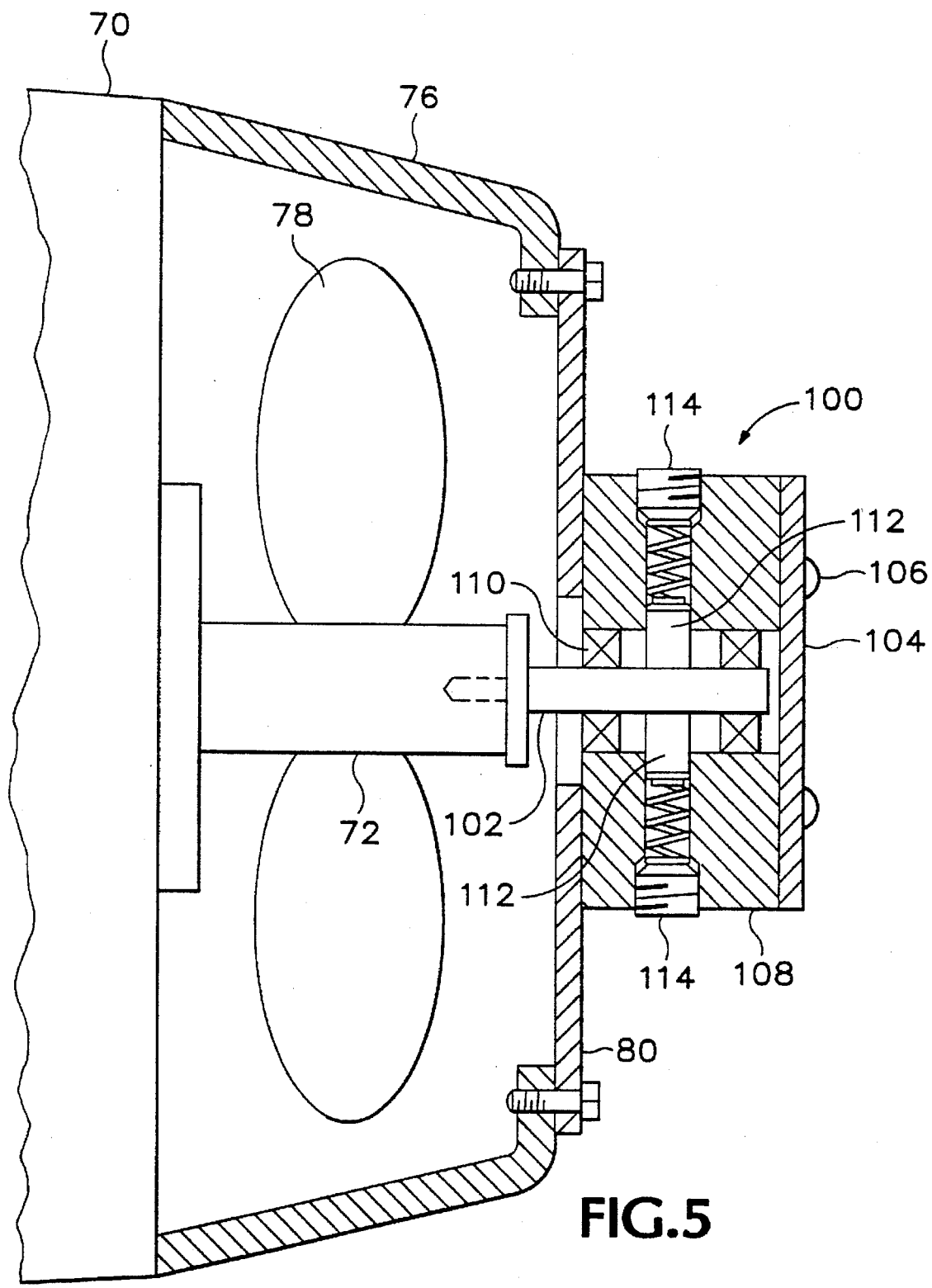
FIG. 5 is a longitudinal, partial cross sectional view of a motor incorporating a grounding system according to a fifth embodiment of the present invention.
Figure 5A:
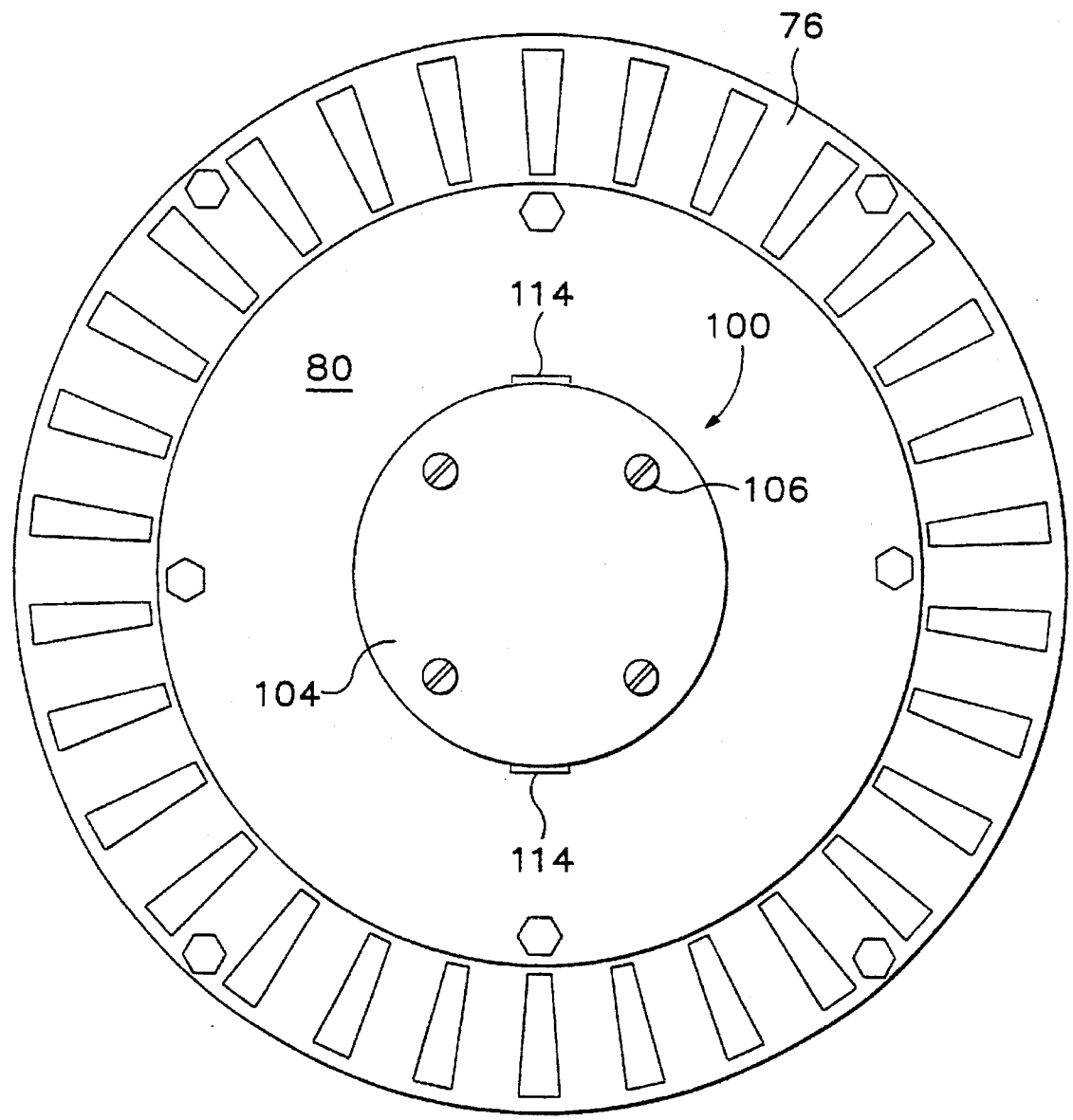
FIG. 5A is an end view of the FIG. 5 system.

FIGS. 5 and 5A illustrate an embodiment adapted for attachment to an AC motor 70 or other rotating machinery, this embodiment comprising a sealed shorting device 100 provided with a stub shaft 102 extending through fan cover 80 (in the case of an AC motor) for attachment to the end of shaft 72. Shaft 102 is suitably formed of brass. The shorting device 100 includes a cylindrical frame 108 provided with an outer cover 104 and bolts 106 that extend through cover 104 and frame 108 to fan cover 80. The stub shaft 102 rotates within sealed bearings or shaft seal 110 that prevents contamination from reaching the interior of the device where the outside of shaft 102 provides a cylindrical contacting surface. Oppositely aligned bores are located at sides of the frame and are radial with respect to stub shaft 102 for allowing opposed brushes 112 to ride upon the contacting surface of stub shaft 102. The opposite bores in frame 108 are appropriately threaded to receive retaining screws 114 for depressing intermediate springs toward the brushes 112.

Although illustrated in FIG. 5 in connection with an AC motor, the embodiment of FIG. 5 is also usable in connection with grounding the shaft of any rotating machine. I.e., stub shaft 102 can be attached to the end of a non-powered shaft of a paper mill roll or the like. In any case, the shaft voltage is shunted to ground.

Figure 6:
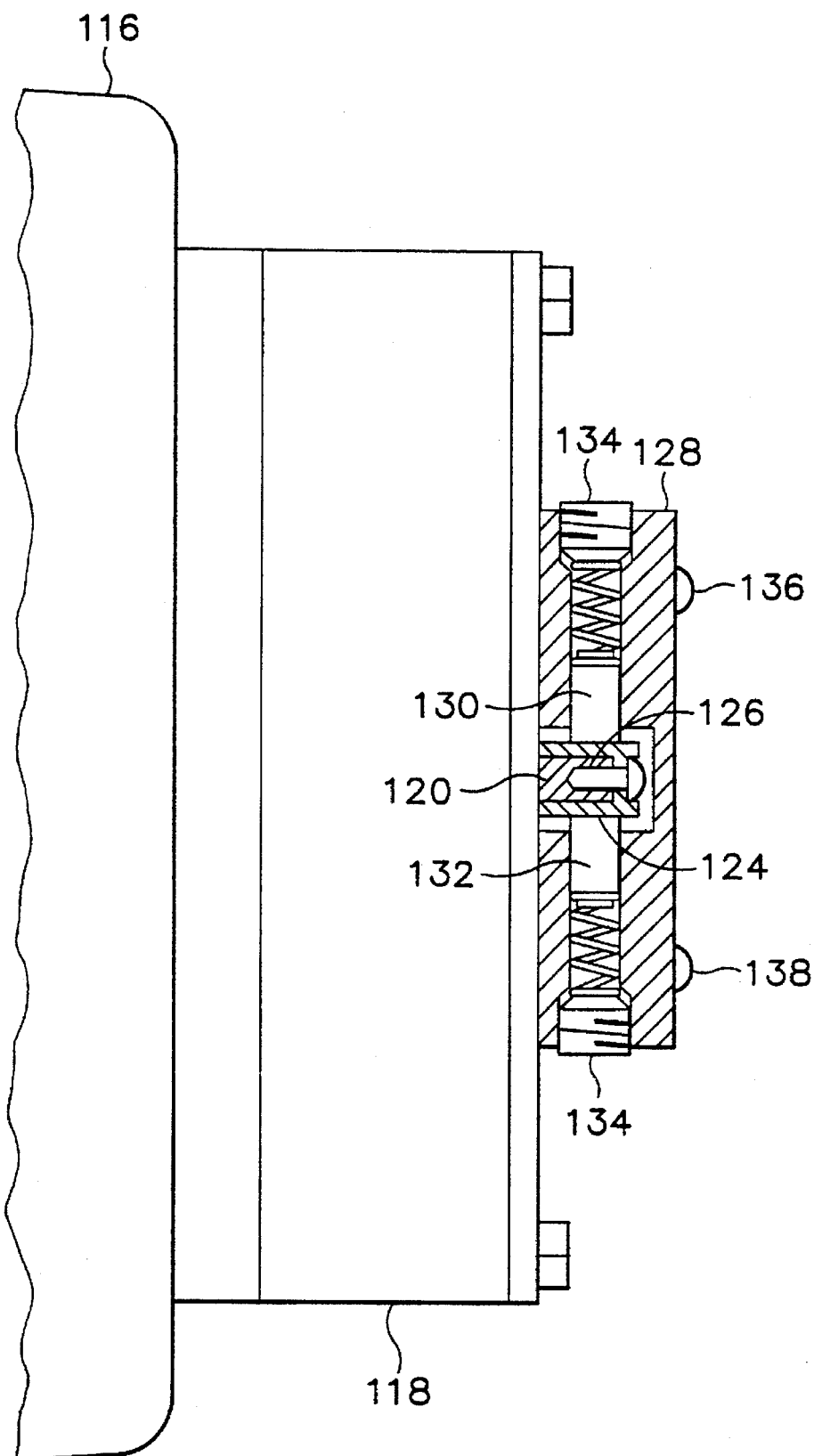
FIG. 6 is a longitudinal, partial cross sectional view of a sixth embodiment of the present invention.
Figure 6A:
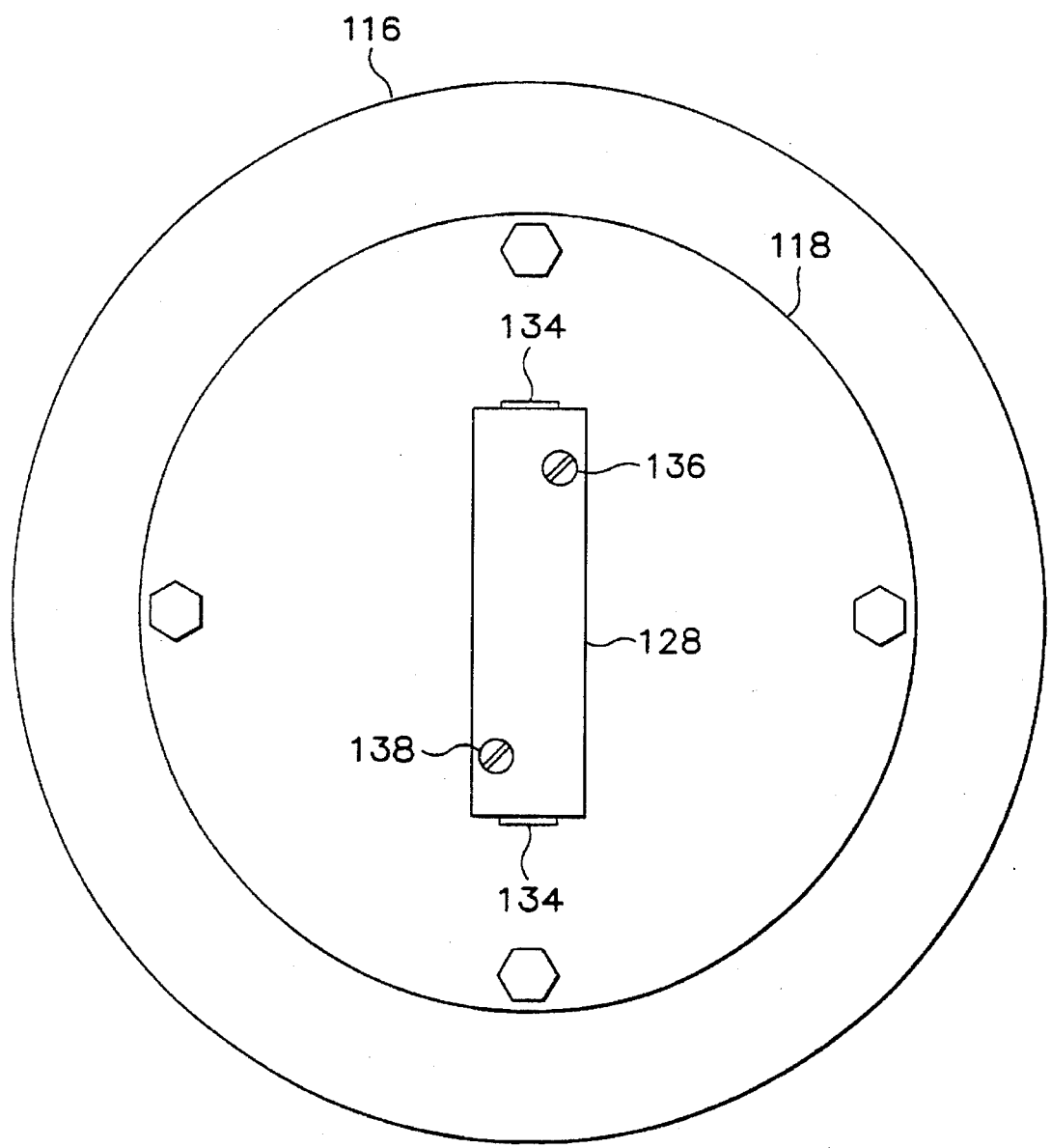
FIG. 6A is an end view of the FIG. 6 system.

Referring to FIG. 6, a further embodiment of a shaft shorting device according to the present invention is illustrated as applied to a DC motor 116 having a tachometer 118 mounted at the commutator end of the motor. In this case, tachometer shaft 120 extends outwardly and is received within a cylindrical contact sleeve 124 suitably formed of brass. The tubular contact sleeve 124 is longitudinally bored to receive tachometer shaft 120, the end of which is threaded to engage screw 126 for holding sleeve 124 in place. The sleeve 124 is rotatably received within a central side bore of metal, e.g. aluminum, bar 128 which is elongate and also provided with end bores extending in the bar's elongate direction to receive brushes 130 and 132 disposed in a direction for riding upon the outer contact surface of sleeve 124. The aligned bores are threaded to receive retainer screws 134 that adjust the pressure on the brushes 130, 132 via intermediate springs. The bar 128 is attached to tachometer 118 by means of bolts 136 and 138. This embodiment is suitable for tachometers having smaller extended shafts and effectively grounds the tachometer shaft as well as the shaft of the motor to which the tachometer attaches for shorting shaft voltages to ground.

Figure 7:
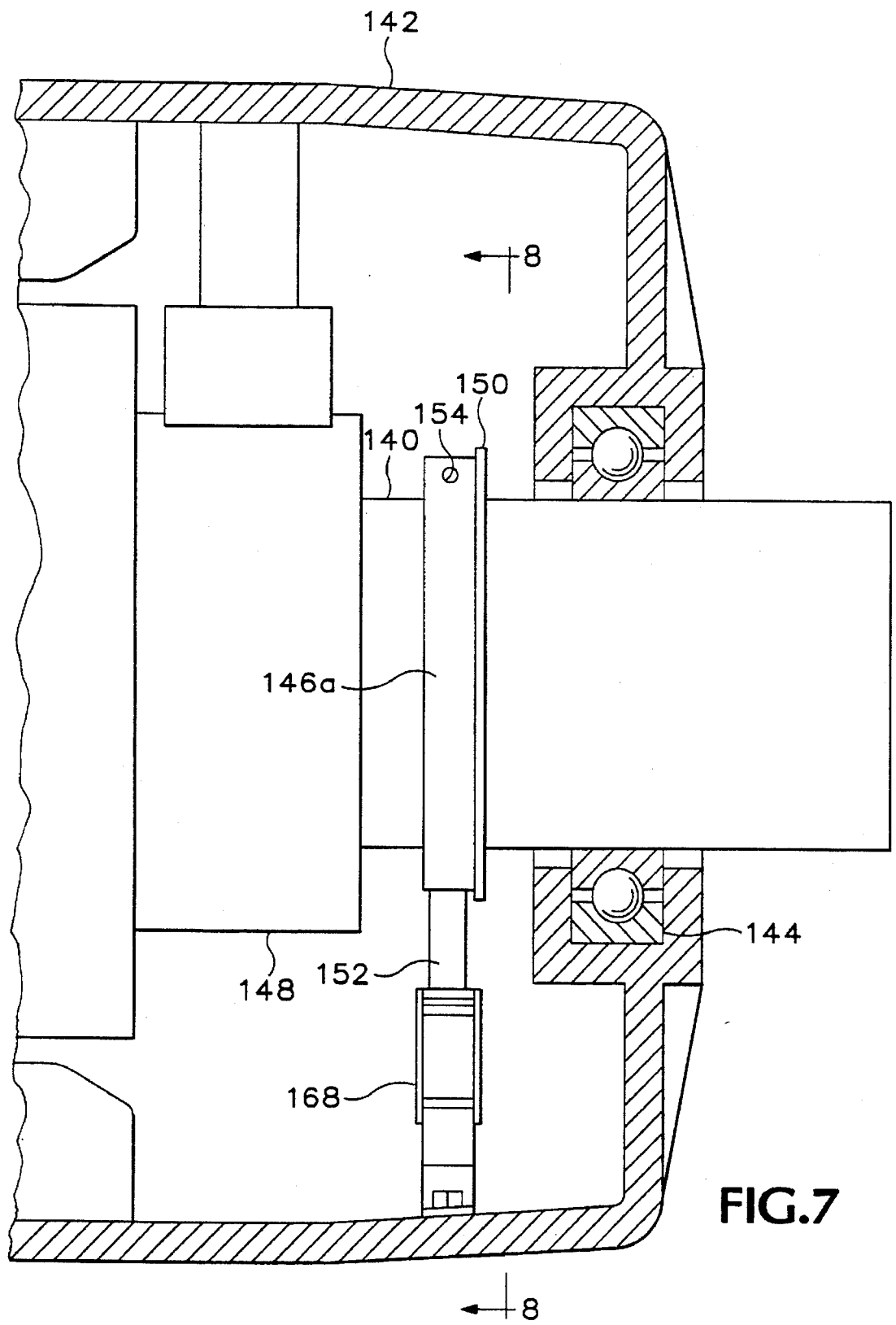
FIG. 7 is a longitudinal cross sectional view of a motor incorporating a grounding system according to a seventh embodiment of the present invention.
Figure 8:
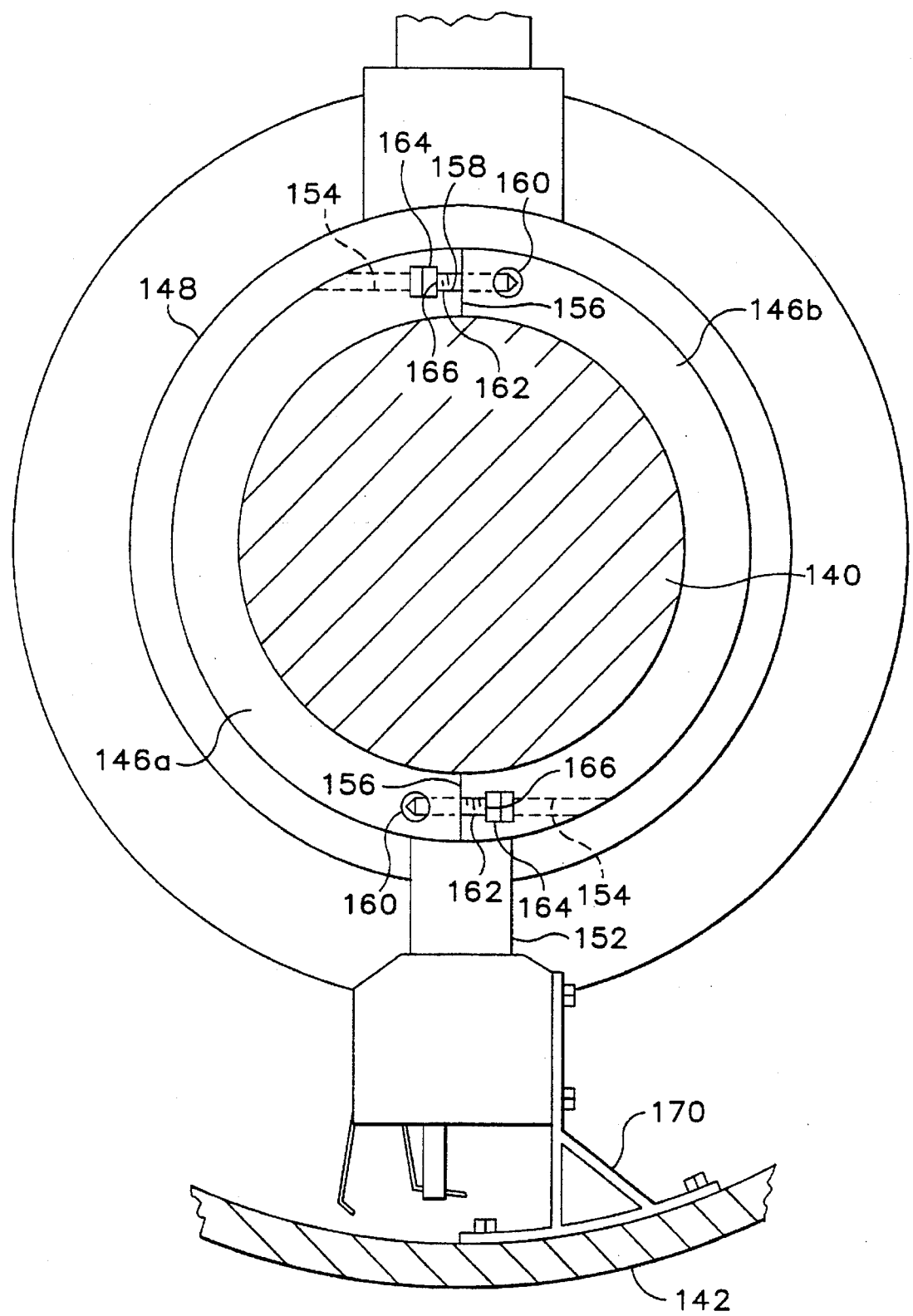
FIG. 8 is a view taken at 8—8 in FIG. 7.

FIGS. 7 and 8 illustrate a further embodiment of a shaft shorting system according to the present invention and is adapted for somewhat larger motors. In this instance, the device is illustrated as attached to the shaft 140 of a DC motor 142 provided with bearings 144. A split ring 146a, 146b is securely fastened to shaft 140, in this case between bearings 144 and motor commutator 148. Each ring section, for example section 146a is formed of brass and is semicircular, having an inside radius adapted to securely engage the outside diameter of the motor shaft 140.

The two halves are solid metal and each is provided with an upstanding shoulder 150 so that when the two sections are assembled together around the shaft, a radial flange is formed on the end of the sleeve provided by the two sections, this end being oriented toward bearings 144. This flange or ring provides a grease slinger protecting the cylindrical contacting surface, as engaged by brush 152, from grease from bearings 144.

Each section of the ring or sleeve is provided with a bore 154 which starts at a circumferential location on the sleeve and which is perpendicular to the diametrical interface or edge 156 between the two sections 146a and 146b. The opposing section has an aligned bore 158 and a threaded plug 160 adapted to engage a fastener 162. The fastener 162 has a head 164 resting on the lower edge 166 of a transverse recess in section 146a and is engageable either through that recess for turning head 164, or through bore 154 through which an Allen head driver may be inserted to drive a mating central recess in head 164. The sections 146a and 146b are drawn up tightly against shaft 140 employing fasteners 162.

Brush 152 is supported by a conventional spring-loaded brush holder 168, wherein the brush is connected to the motor frame. The brush holder is also supported from the motor frame by means of a bracket 170 which is welded or otherwise attached to the interior of the frame.

As in the case of the prior embodiments, the embodiment of FIGS. 7 and 8 effectively grounds the motor shaft 140 to the motor frame thereby substantially eliminating high voltage transients across the bearing 144 whereby bearing pitting and fluting is prevented for a considerable length of time. As with the previously described embodiments, the embodiment according to FIGS. 7 and 8 is readily applicable to an existing motor without the requirement the motor be disassembled or moved. That is, the ring assembly as depicted in FIGS. 7 and 8 is readily secured, for example, to a DC motor at the commutator end of the shaft without having to move the motor in any way. At the same time, the shorting system is protected from contaminants thrown from bearings 144.

The edges of the sections of the cylindrical contacting surface over which the brush passes may be spiral cut, i.e., so that the brush makes a substantial connection with the oncoming area of the contacting surface before contact is lost with the prior area of the contacting surface.

The embodiments of the present invention have the advantages of easy and rapid installation and can be retrofitted to substantially any motor in service at a comparatively small cost as compared with other proposed solutions to the motor shaft voltage problem. Although described in connection with applications for AC and DC motors, the same grounding systems are readily applicable to other rotating machinery such as non-driven rolls having a static electricity problem.

The brushes hereinbefore described are carbon brushes as employed in the electric motor industry, and are preferably copper impregnated carbon brushes. In particular, grade number 672 as supplied by Helwig Carbon, Inc. has been utilized in the described embodiments and is preferred.

The contact member has been hereinabove described as preferably formed of brass. In the hereinabove referenced embodiments, a brass comprising SAE 660 continuous cast bearing bronze (UNS C 93 200) was utilized and is preferred. This brass has a composition of 83% copper, 7% tin, 7% lead and 3% zinc. It is not intended, however, that the present invention be limited to a particular grade or composition of brush or contact material. It is in any case preferred that the contacting surface comprise a non-magnetic, highly conductive, corrosion-resistant surface, and in some instances stainless steel can be substituted for brass but brass is preferred. The grade of brush is selected for making a low resistance, continuous connection with the contacting surface.

While several embodiments of the present invention have been shown and described, it will be apparent to those skilled in the art that many further changes and modifications may be made without departing from the invention in its broader aspects. The appended claims are therefore intended to cover all such changes and modifications as fall within the true spirit and scope of the invention.

We claim:

1. Apparatus for electrically discharging a rotating shaft, said apparatus comprising:
    contact means providing an electrical contacting surface, said contact means comprising a member distinct from the shaft but removably attached to said shaft for rotation with said shaft and electrically connected thereto;
    said contact means, where it provides said surface, being formed of a conductive material having a substantially higher resistance to corrosion than said rotating shaft to maintain a low electrical resistance, and
    means for holding a conductive brush in resilient and continuous frictional contact with said contacting surface to provide a continuous low impedance frictional contact with said contacting surface so as to provide a continuous electrical discharge path for said shaft.

2. An apparatus according to claim 1 wherein said contact means is formed of a material which is substantially non-reactive as compared with said rotating shaft.

3. An apparatus according to claim 2 wherein said contact means is formed of brass.

4. An apparatus according to claim 2 wherein said contact means is formed of stainless steel.

5. Apparatus for electrically discharging a rotating shaft of a machine, said machine having a frame supporting bearings journalling said shaft, said apparatus comprising:
    contact means providing an electrical contacting surface, said contact means comprising a member distinct from the shaft but removably attached to said shaft for rotation with said shaft and electrically connected thereto;
    said contact means, where it provides said surface, being formed of a durable, highly conductive, corrosion resistant material adapted for providing a low resistance connection to avoid sources of corrosion and/or contamination characteristic of making connection with the shaft itself; and
    means for holding a conductive brush in resilient and continuous frictional contact with said contacting surface to complete a continuous, low resistance frictional contact with said contacting surface, said brush being grounded to said frame so as to provide a continuous, low-impedance electrical discharge path for said shaft across said bearings for fully shorting said shaft to ground and avoiding high voltage transients across said bearings as induced in said shaft that would cause pitting of said bearings by high voltage discharge.

6. An apparatus according to claim 5 wherein the contact means comprises means attached to the end of said shaft and provided with a said contacting surface which is substantially orthogonal to the axis of said shaft;
    said holding means urging said brush in a direction longitudinal of said shaft toward said contacting surface.

7. An apparatus according to claim 6 wherein said holding means also urges a second conductive brush in resilient and continuous contact with said contacting surface so as to provide a second continuous electrical discharge path for said shaft, said holding means urging said brushes in a direction parallel to the axis of said shaft, said brushes being offset from one another and from the axis of said shaft.

8. An apparatus according to claim 6 wherein said holding means urges said brush substantially in a direction axial of said shaft.

9. An apparatus according to claim 6 wherein said shaft is the combined shaft of a motor and a tachometer.

10. An apparatus according to claim 6 wherein said holding means comprises a first stationary member and a second movable member axially slidable within said first stationary member for supporting said brush, and means for selectively positioning said slidable member within said first stationary member.

11. An apparatus according to claim 6 further including an axially compressible ring formed of elastomeric material disposed in surrounding relation to said brush between said slidable member and said contacting surface.

12. An apparatus according to claim 11 wherein said ring comprises a compressible V-ring.

13. An apparatus according to claim 5 wherein said contact means comprises an extension shaft rotatably secured to said rotating shaft, and wherein said holding means urges said brush radially toward the axis of said extension shaft.

14. An apparatus according to claim 13 wherein said rotating shaft is the combined shaft of a motor and a tachometer.

15. An apparatus according to claim 13 including means sealing said brush from said rotating shaft.

16. An apparatus according to claim 13 wherein said holding means also urges a second brush radially toward the axis of said extension shaft.

17. An apparatus according to claim 5 wherein the contact means comprises two halves of a cylindrical brass sleeve, and coupling means for removably coupling the two halves together directly around a portion of the shaft and securing the halves in intimate mechanical and electrical contact therewith, the two halves when coupled forming a sleeve having a smooth, continuous, outer cylindrical surface providing said contacting surface along the outside of said sleeve, said holding means being further operative for functionally positioning the conductive brush for contacting the outer cylindrical surface of said sleeve.

18. An apparatus according to claim 17 wherein said two halves have shoulders at one end thereof relative to their cylindrical length, so that when the two halves are joined, said shoulders of the two halves provide a radial flange proximate one end of the cylindrical sleeve for protecting the contacting surface from contaminants.

19. An apparatus according to claim 17 wherein said shaft is the shaft of an electric motor having a frame and said holding means comprises a bracket mounted to the frame of the motor, an arm of said bracket extending from the housing frame toward said shaft, and means disposed on the distal end of said arm for seating said conductive brush to provide said resilient and continuous contact with said contacting surface.

20. An apparatus according to claim 5 wherein said contact means is formed of brass.

21. An apparatus according to claim 5 wherein said contact means is formed of stainless steel.

22. An apparatus for electrically discharging a rotating shaft of a machine, said machine having a frame supporting bearings journalling said shaft, said apparatus comprising:
contact means providing an electrical contacting surface, said contact means comprising an extension shaft rotatably secured to said rotating shaft;
said contact means, where it provides said surface, being formed of a durable, highly conductive, corrosion resistant material adapted for providing a low resistance connection to avoid sources of corrosion and/or contamination characteristic of making connection with the shaft itself; and
means for holding a conductive brush in resilient and continuous frictional contact with said contacting surface to complete a continuous, low resistance frictional contact with said contacting surface, said brush being grounded to said frame so as to provide a continuous, low-impedance electrical discharge path for said shaft across said bearings for fully shorting said shaft to ground and avoiding high voltage transients across said bearings as induced in said shaft that would cause pitting of said bearings by high voltage discharge.

23. An apparatus according to claim 22 including means sealing said brush from said rotating shaft.

24. An apparatus according to claim 22 wherein said holding means also urges a second brush radially toward the axis of said extension shaft.

25. An apparatus according to claim 22 wherein said contact means is formed of brass.

26. An apparatus according to claim 22 wherein said contact means is formed of stainless steel.

27. Apparatus for electrically discharging a rotating shaft, said apparatus comprising:
contact means providing an electrical contacting surface, said contact means comprising an extension shaft rotatably secured to said rotating shaft;
said contact means, where it provides said surface, being formed of a conductive material having a substantially higher resistance to corrosion than said rotating shaft to maintain a low electrical resistance, and
means for holding a conductive brush in resilient and continuous contact with said contacting surface so as to provide a continuous electrical discharge path for said shaft, said holding means urging said brush radially toward the axis of said extension shaft to engage the side of said extension shaft providing said contacting surface.

28. An apparatus according to claim 22 wherein said rotating shaft is the shaft of a tachometer.

29. An apparatus according to claim 27 wherein said contact means is formed of a material which is substantially non-reactive as compared with said rotating shaft.

30. An apparatus according to claim 29 wherein said contact means is formed of brass.

31. An apparatus according to claim 29 wherein said contact means is formed of stainless steel.

32. Apparatus for electrically discharging a rotating shaft of a machine, said machine having a frame supporting bearings journalling said shaft, said shaft having an end displaced from said bearings,
said end of said shaft having a contacting surface,
said apparatus including means for holding a conductive brush directly in resilient and continuous frictional contact with said contacting surface at the end of said shaft so as to provide a continuous electrical discharge path for said shaft,
wherein said holding means urges said brush in a direction substantially longitudinal of said shaft toward said contacting surface.

33. An apparatus according to claim 32 wherein said holding means urges said brush in a direction substantially axial of said shaft.

34. An apparatus according to claim 32 wherein said contacting surface is substantially flat and orthogonal to the axis of said shaft.

35. An apparatus according to claim 32 wherein said shaft is the combined shaft of a motor and a tachometer, said tachometer having wheel means interposed between said bearings and said contacting surface.

36. An apparatus according to claim 32 wherein said shaft is the shaft of a motor.

37. An apparatus according to claim 32 wherein said holding means comprises a first stationary member and a second movable member axially slidable within said first stationary member for supporting said brush, and means for selectively positioning said slidable member within said first stationary member.

38. An apparatus according to claim 32 further including an axially compressible ring formed of elastomeric material disposed in surrounding relation to said brush and adjoining said contacting surface.

39. An apparatus according to claim 38 wherein said ring comprises a compressible V-ring.

40. An apparatus according to claim 32 wherein said contacting surface is substantially less reactive than said rotating shaft to maintain a low electrical resistance.

41. An apparatus according to claim 40 wherein said contacting surface is formed of brass.

42. An apparatus according to claim 40 wherein said contacting surface is formed of stainless steel.

* * * * *